United States Patent
Gune et al.

(10) Patent No.: US 6,453,760 B1
(45) Date of Patent: Sep. 24, 2002

(54) AUTOMATED DETECTION OF UNACCEPTABLE WARPAGE OF TRAYS FOR HOLDING INTEGRATED CIRCUIT PACKAGES

(75) Inventors: Rahul V. Gune, Pakkred Nonthaburi (TH); Watcharin Pinlam, Pathumthanee (TH)

(73) Assignee: Advanced Micro Device, Inc., Sunnyvale, CA (US)

( * ) Notice: Subject to any disclaimer, the term of this patent is extended or adjusted under 35 U.S.C. 154(b) by 315 days.

(21) Appl. No.: 09/609,790

(22) Filed: Jul. 3, 2000

(51) Int. Cl.[7] ............................................. G01B 11/10
(52) U.S. Cl. ................................................. 73/865.8
(58) Field of Search ........................ 73/865.8; 356/376, 356/381, 387; 250/223; 340/674, 678

(56) References Cited

U.S. PATENT DOCUMENTS

| | | | |
|---|---|---|---|
| 4,966,460 A | * 10/1990 | Kabley | ........................ 356/387 |
| 5,104,581 A | * 4/1992 | Ito et al. | |
| 5,428,100 A | * 6/1995 | Asai et al. | |
| 5,601,364 A | * 2/1997 | Ume | ........................... 356/376 |
| 5,699,161 A | * 12/1997 | Woodworth | ................. 356/376 |
| 5,961,915 A | * 10/1999 | Toyouchi et al. | |
| 6,122,065 A | * 9/2000 | Gauthier | ..................... 356/376 |

* cited by examiner

*Primary Examiner*—Robert Raevis
(74) *Attorney, Agent, or Firm*—Monica H. Choi (57) ABSTRACT

Unacceptable warpage of a tray for holding a plurality of integrated circuit packages is automatically detected after an operator places the tray on a conveyor. The conveyor holds and moves the tray along a predetermined linear path, and the predetermined linear path is along a length of the tray. Each of a plurality of tray position sensors is disposed at a respective location along the predetermined linear. path, and each tray position sensor detects when an object that moves with the conveyor, such as a bracket that is connected to the conveyor, has reached the respective location along the predetermined linear path. A laser beam source is disposed on a first side of the predetermined path for generating a laser beam toward a first side of the tray, and the laser beam has a field that extends through any possible height of the tray. A laser beam sensor is disposed on a second side of the predetermined path and faces toward a second side of the tray that is opposite the first side of the tray such that the laser beam sensor detects a portion of the laser beam that is not blocked by the tray. A data processor controls the conveyor to move the tray along the predetermined path. When the object that moves with the conveyor reaches a tray position sensor, the data processor controls the conveyor to stop movement of the tray such that a measured height of the tray at a measured location of the tray is determined from the portion of the laser beam that is not blocked by the tray at the measured location of the tray as detected by the laser beam sensor. The tray is determined to be unacceptably warped when the measured height is greater than a predetermined value.

14 Claims, 5 Drawing Sheets

AUTOMATED DETECTION OF UNACCEPTABLE WARPAGE OF TRAYS FOR HOLDING INTEGRATED CIRCUIT PACKAGES

TECHNICAL FIELD

The present invention relates generally to manufacture of IC (integrated circuit) packages, and more particularly, to an apparatus and method for automatically detecting unacceptable warpage of trays for holding IC packages to prevent occurrence of bent leads on the IC packages.

BACKGROUND OF THE INVENTION

Figure 1:
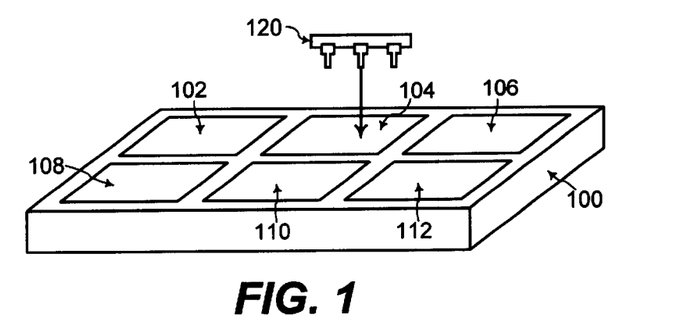
FIG. 1 shows a tray for holding IC (integrated circuit) packages.

Referring to FIG. 1, during manufacture of IC (integrated circuit) packages, the IC packages are placed into a tray 100 for transporting the IC packages. The tray 100 includes a plurality of pockets including a first pocket 102, a second pocket 104, a third pocket 106, a fourth pocket 108, a fifth pocket 110, and a sixth pocket 112 with each pocket holding a respective IC package. For example, an IC package 120 is placed in the second pocket 104. A tray typically has more numerous pockets, but six pockets are shown in FIG. 1 for clarity of illustration.

During manufacture of IC packages, the tray 100 holding the plurality of IC packages is heated to temperatures above 100° Celsius for example. The tray 100 holding the plurality of IC packages after being heated is also cooled down to room temperature. With repeated heating and cooling of the tray 100 during manufacture of a high number of IC packages, the tray 100 becomes warped in shape. When the tray 100 is warped in shape, an IC package may no longer fit with the dimensions of a pocket of such a warped tray. In that case, when an operator attempts to place an IC package into or out of the pocket of a warped tray, the leads of the IC package may become undesirably bent since the IC package does not fit within such a pocket.

Figure 2:
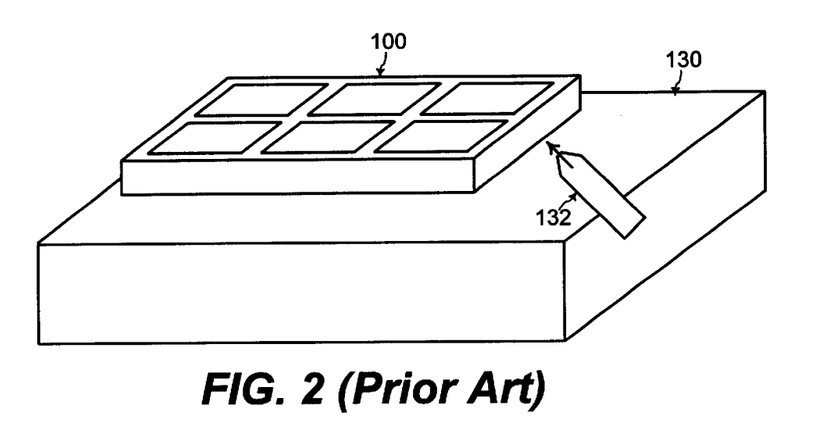
FIG. 2 shows a mechanism for manually detecting for an unacceptably warped tray using feeler gauges, in the prior art.

Thus, a tray that is unacceptably warped after repeated heating and cooling of the tray is scrapped. Referring to FIG. 2, for determining whether a tray is unacceptably warped in the prior art, the tray 100 is set on a flat table surface 130. An operator manually holds a feeler gauge 132 and slides the feeler gauge 132 under a plurality of predetermined locations of the tray 100 while the tray 100 is set on the table surface 130. Multiple feeler gauges of various thicknesses are used in this manual process. The operator starts with the thinnest feeler gauge that slides under at least one of the plurality of predetermined locations of the tray 100.

The operator then uses feeler gauges having higher thickness until a feeler gauge of limiting thickness no longer slides under any of the plurality of predetermined locations of the tray 100. The thickness of such a feeler gauge of limiting thickness determines the amount of warpage of the tray 100. A higher thickness of such a feeler gauge of limiting thickness indicates a higher amount of warpage, and a lower thickness of such a feeler gauge of limiting thickness indicates a lower amount of warpage.

Such manual determination of the amount of warpage in the prior art is time consuming as the operator works through feeler gauges of increasing thickness. In addition, the accuracy of such manual determination of the amount of warpage in the prior art depends on the skill of the operator, and such manual determination of the amount of warpage in the prior art is prone to human error. If a good tray is determined to be unacceptably warped by human error, then a good tray may be wasted in being scrapped. On the other hand, if an unacceptably warped tray is determined to be a good tray by human error, then the IC packages may not fit within the pockets of such a tray resulting in bent leads of the IC packages.

Thus, a mechanism is desired for automatically detecting unacceptably warped trays.

SUMMARY OF THE INVENTION

Accordingly, in a general aspect of the present invention, a conveyor is used for moving a tray through a laser beam such that the portion of the laser beam that is not blocked by the tray determines the amount of warpage of the tray.

An apparatus and method of one aspect of the present invention automatically detects unacceptable warpage of a tray for holding a plurality of integrated circuit packages. A conveyor holds and moves the tray along a predetermined linear path, and the predetermined linear path is along a length of the tray. Each of a plurality of tray position sensors is disposed at a respective location along the predetermined linear path, and each tray position sensor detects when an object that moves with the conveyor has reached the respective location along the predetermined linear path.

In addition, a laser beam source is disposed on a first side of the predetermined path for generating a laser beam toward a first side of the tray, and the laser beam has a field that extends through any possible height of the tray. A laser beam sensor is disposed on a second side of the predetermined path and faces toward a second side of the tray that is opposite the first side of the tray such that the laser beam sensor detects a portion of the laser beam that is not blocked by the tray.

Furthermore, a data processor is coupled to the conveyor, the plurality of tray position sensors, and the laser beam sensor. The data processor controls the conveyor to move the tray along the predetermined path. When the object that moves with the conveyor reaches a tray position sensor, the data processor controls the conveyor to stop movement of the tray such that a measured height of the tray at a measured location of the tray is determined from the portion of the laser beam that is not blocked by the tray at the measured location of the tray as detected by the laser beam sensor. The tray is determined to be unacceptably warped when the measured height is greater than a predetermined value.

The present invention may be used to particular advantage when the plurality of tray position sensors are positioned along the predetermined path such that a respective measured height of the tray is determined at each of a front location of the tray substantially toward the front end of the tray along the length of the tray, a center location of the tray substantially toward a center along the length of the tray, and a back location of the tray substantially toward a back end of the tray along the length of the tray. In that case, the tray is determined to be unacceptably warped when any of the respective measured height of the tray at the front location, the center location, or the back location is greater than the predetermined value.

An alarm unit, coupled to the data processor, warns an operator when the tray is determined to be unacceptably warped. A first counter counts a first number of unacceptably warped trays, and a second counter counts a second number of good trays that are not unacceptably warped.

In this manner, an operator simply sets and clamps a tray to the conveyor, and the tray is moved by the conveyor through a laser beam for automatically determining whether the tray is unacceptably warped. The automated mechanism for detecting trays that are unacceptably warped is less time consuming, more accurate, and less prone to human error.

These and other features and advantages of the present invention will be better understood by considering the following detailed description of the invention which is presented with the attached drawings.

The figures referred to herein are drawn for clarity of illustration and are not necessarily drawn to scale. Elements having the same reference number in FIGS. 1, 2, 3, 4, 5, 6, and 7 refer to elements having similar structure and function.

DETAILED DESCRIPTION

Figure 3:
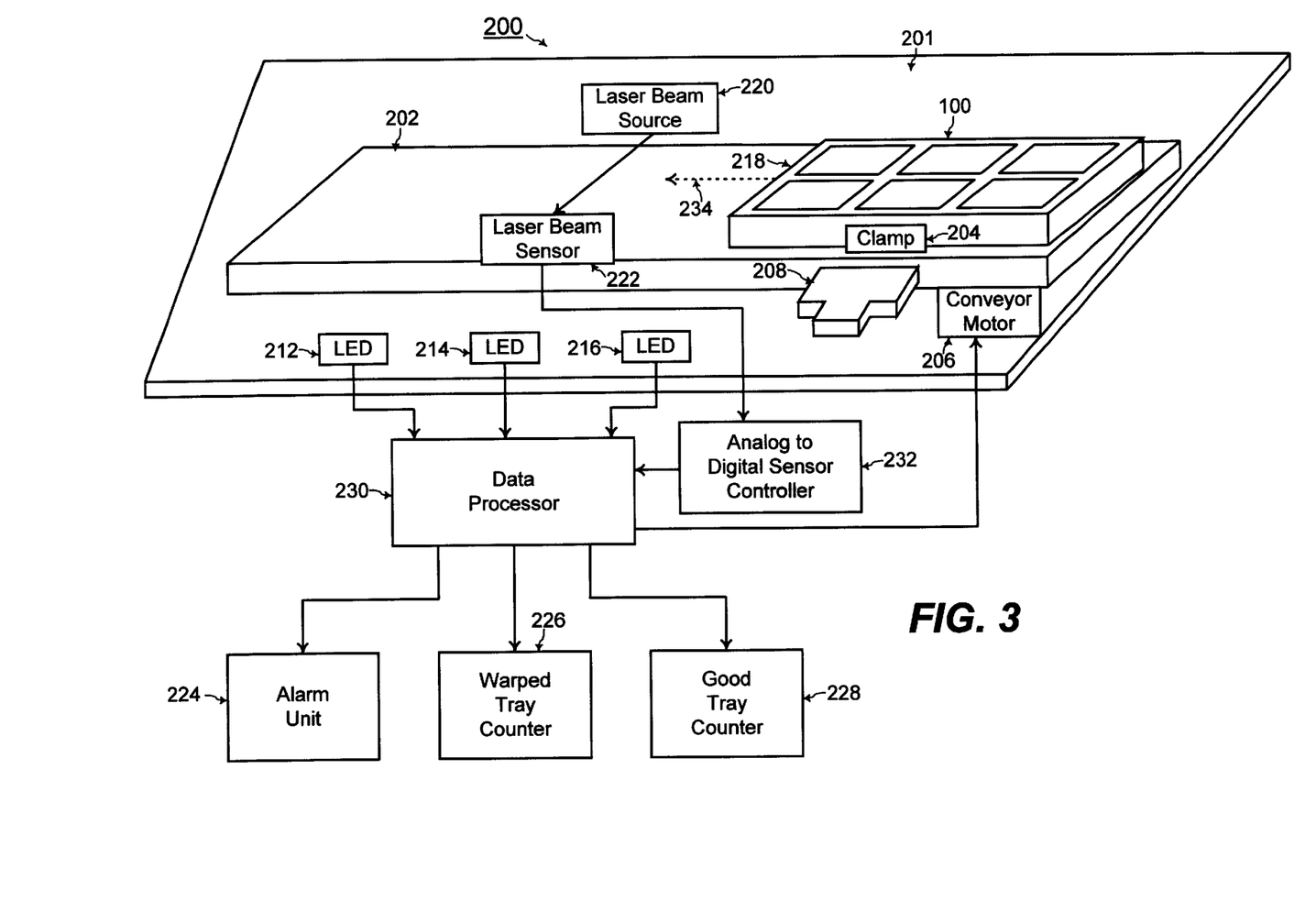
FIG. 3 shows components of an apparatus for automatically detecting for an unacceptably warped tray by moving the tray through a laser beam with a conveyor and determining the portion of the laser beam not blocked by the tray, according to an embodiment of the present invention.

Referring to FIG. 3, an apparatus 200 for automatically detecting for an unacceptably warped tray includes a fixed table 201 and a conveyor 202 mounted on the fixed table 201. The conveyor 202 holds and moves the tray 100 along a predetermined linear path. The tray 100 is fixedly held to the conveyor 200 with a clamping mechanism 204. A conveyor motor 206 is used for powering the movement of the conveyor 200. Conveyor systems and clamping mechanisms are known to one of ordinary skill in the art of mechanics.

In addition, a plurality of tray position sensors, including a first tray position sensor 212, a second tray position sensor 214, and a third tray position sensor 216 are disposed along the predetermined linear path of the conveyor 202. Each of the tray position sensors 212, 214, and 216 is disposed at a respective location along the predetermined linear path of the conveyor 202. Each of the tray position sensors 212, 214, and 216 is comprised of a light source such as a LED (light emitting diode) and a light detector such as a photodiode.

The LED emits a light toward the conveyor 202, and the photodiode detects for the reflection of such light by an object that moves with the conveyor 202 such as a bracket 208 that is connected to the conveyor 202 to move with the conveyor 202. When any portion of the bracket 208 is positioned in the path of such light, the light is reflected by the bracket 208 to the photodiode. Light sources such as LEDs and light sensors such as photodiodes are known to one of ordinary skill in the art of electronics.

Initially, when the tray 100 is positioned at the initial end of the conveyor 202 as illustrated in FIG. 3, the bracket 208 does not block the light from any of the LEDs of the tray position sensors 212, 214, and 216. As the tray 100 is moved by the conveyor 202 toward the tray position sensors 212, 214, and 216, when the bracket 208 which moves with the conveyor 202 reaches the respective location of a tray position sensor, the bracket 208 blocks the light from the LED of that tray position sensor. In that case, the photodiode of that tray position sensor begins to detect the reflected light indicating that the bracket 208 has reached that tray position sensor as the tray 100 is moved by the conveyor 202.

The apparatus 200 also includes a laser beam source 220 disposed on a first side of the predetermined path of the conveyor 202. The laser beam source 220 generates a laser beam toward a first side of the tray 100. A laser beam sensor 222 is disposed on a second side of the predetermined path of the conveyor 202 and faces toward the second side of the tray 100 that is opposite to the first side of the tray 100 having the laser beam source 220. The laser beam sensor 222 is aligned with laser beam from the laser beam source 220 such that the laser beam sensor 222 detects the portion of the laser beam from the laser beam source 220 that is not blocked by the tray 100. Sources for generating laser beams and sensors for detecting laser beams are known to one of ordinary skill in the art of electronics.

The apparatus 200 further includes an alarm unit 224 for providing a warning signal to an operator when a tray is determined to be unacceptably warped. Visual and audible alarm units are known to one of ordinary skill in the art of electronics. In addition, a warped tray counter 226 keeps count of the number of trays determined to be unacceptably warped, and a good tray counter 228 keeps count of the number of good trays determined not to be unacceptably warped. Counters are known to one of ordinary skill in the art of electronics.

A data processor 230 is coupled to the conveyor motor 206, the plurality of tray position sensors 212, 214, and 216, the laser beam sensor 222, the alarm unit 224, the warped tray counter 226, and the good tray counter 228 for coordinating operation of these components for automatically detecting for an unacceptably warped tray. The data processor 230 may be any type of digital data processing device such as a computer or a programmable logic controller, as known to one of ordinary skill in the art of electronics.

An analog-to-digital sensor controller 232 is coupled between the laser beam sensor 222 and the data processor 230 for converting an analog signal from the laser beam sensor 222 to a digital signal that is processed to determine a measured height of the tray 100 from the analog signal of the laser beam sensor 222. The analog-to digital sensor controller 232 compares the measured height to a predetermined value to determine whether the tray 100 is unacceptably warped as described herein below. Analog-to-digital sensor controllers are commercially available and known to one of ordinary skill in the art of electronics. An example of an analog-to-digital sensor controller that is commercially available is the Compact Analog Sensor Controller with model number RV10, from Keyence Corp. located at Woodcliff Lake, N.J.

During operation of the apparatus 200, an operator places the tray 100 at an initial position on the conveyor 202 before the tray 100 reaches the laser beam from the laser beam source 220 (as illustrated in FIG. 3). The operator may press a start button coupled to the data processor 230 indicating to the data processor 230 that the tray 100 has been properly placed at the initial position on the conveyor 202. The data processor 230 sends a control signal to the conveyor motor 206 to move the conveyor 202 such that the tray 100 is moved along the predetermined linear path. The predetermined linear path is along the length of the tray 100 (as illustrated by the dashed arrow 234 in FIG. 3). In addition, in an alternative embodiment of the present invention, the data processor 230 may be coupled to the clamp 204 for controlling the clamp 204 to tighten the hold on the tray 100 by the clamp 204.

Initially, as the tray 100 travels along the predetermined linear path, the bracket 208 is not blocking the light from the LED of any of the tray position sensors 212, 214, and 216, and the photodiodes at the tray position sensors 212, 214, and 216 do not sense light reflected by the bracket 208.

Figure 4:
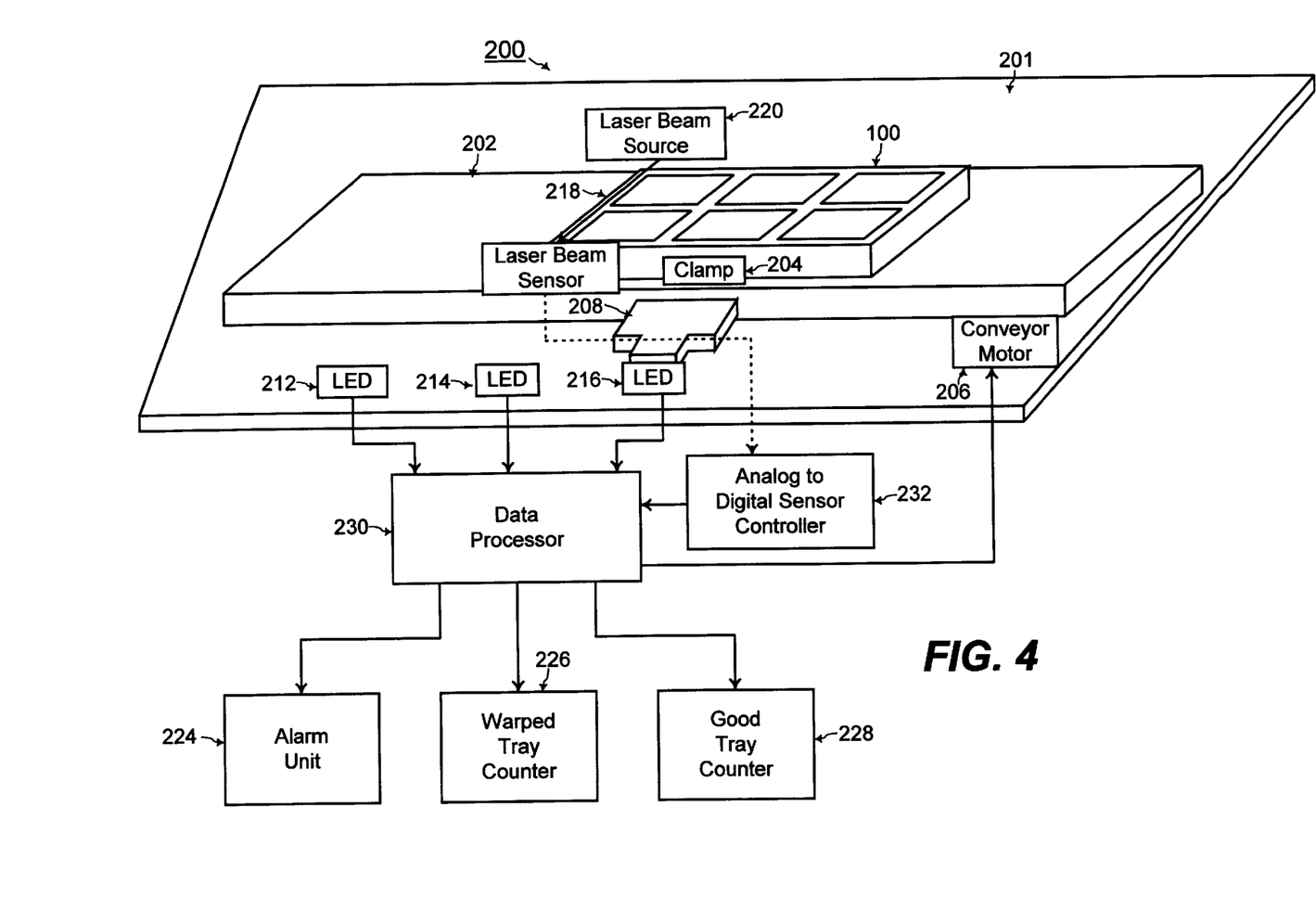
FIG. 4 shows the laser beam of the apparatus of FIG. 3 being directed toward a first location of the tray substantially toward a front end of the tray along the length of the tray, according to an embodiment of the present invention.

Referring to FIGS. 3 and 4, as the tray 100 is moved along the predetermined linear path, the bracket 208 reaches the respective location of the first tray position sensor 212. The bracket 208 blocks the light from the LED of the first tray position sensor 212, and this light is reflected by the block 208 such that the photodiode at the first tray position sensor 212 detects the reflected light. When the photodiode detects the reflected light, a signal is sent from the photodiode of the first tray position sensor 212 to the data processor 230 indicating that the bracket 208 has reached the first tray position sensor 212.

Figure 5:
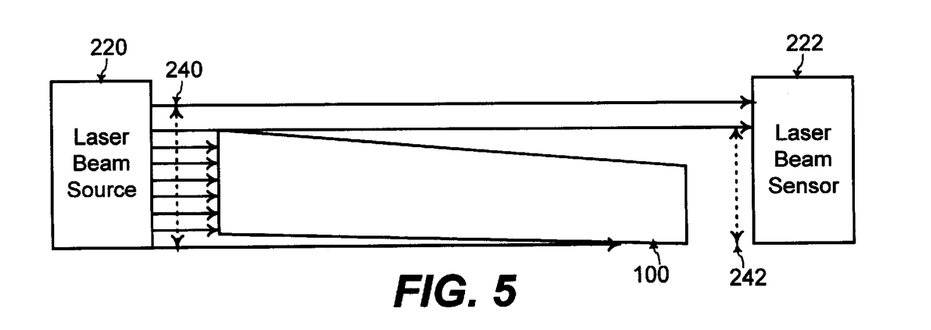
FIG. 5 illustrates the blockage of the laser beam of the apparatus of FIG. 3 up to the highest height a warped tray, according to an embodiment of the present invention.

At this point, the data processor 230 controls the conveyor motor 206 to stop movement of the tray 100 along the predetermined linear path. Referring to FIGS. 4 and 5, when the movement of the tray 100 is stopped with the bracket 208 being at the first tray position sensor 212, the laser beam from the laser beam source 220 is directed toward a measured location of the tray 100 that is toward the front end 218 of the tray 100. FIG. 5 shows a cross section of the measured location of the tray 100.

The laser beam source 220 generates a laser beam having a field 240 that extends through any possible height of the tray 100 (as illustrated by the dashed line 240 in FIG. 5). The laser beam from the laser beam source 220 is directed toward the tray 100 at the measured location of the tray. The laser beam from the laser beam source 220 is blocked by the tray 100 from the bottom of the laser beam up to a highest height of the tray 100 at the measured location of the tray 100 (as illustrated by the dashed line 242 in FIG. 5). The highest height 242 of the tray 100 is determined by the warpage at the measured location of the tray 100.

The portion of the laser beam that is not blocked by the tray 100 is detected by the laser beam sensor 222, and this portion of the laser beam indicates the highest measured height at the measured location of the tray 100. The laser beam sensor 222 generates a signal indicating the highest measured height at the measured location of the tray 100. When this signal is an analog signal, the analog-to-digital sensor controller 232 converts the analog signal to a digital signal and compares the highest measured height of the tray 100 at the measured location to a predetermined value. The predetermined value is determined by the acceptable amount of warpage of the tray 100. If the highest measured height is greater than the predetermined value, then the analog-to-digital sensor controller 232 determines that the tray 100 is unacceptably warped, and sends a reject signal to the data processor 230.

If the tray 100 is determined to be unacceptably warped when the bracket 208 is at the first tray position sensor 212, the data processor 230 may control the alarm unit 224 to generate a warning signal such as a visual or audible signal to an operator. In that case, the operator scraps the unacceptably warped tray 100, and the data processor 230 increments the warped tray counter 226 to keep count of the number of unacceptably warped trays.

Figure 6:
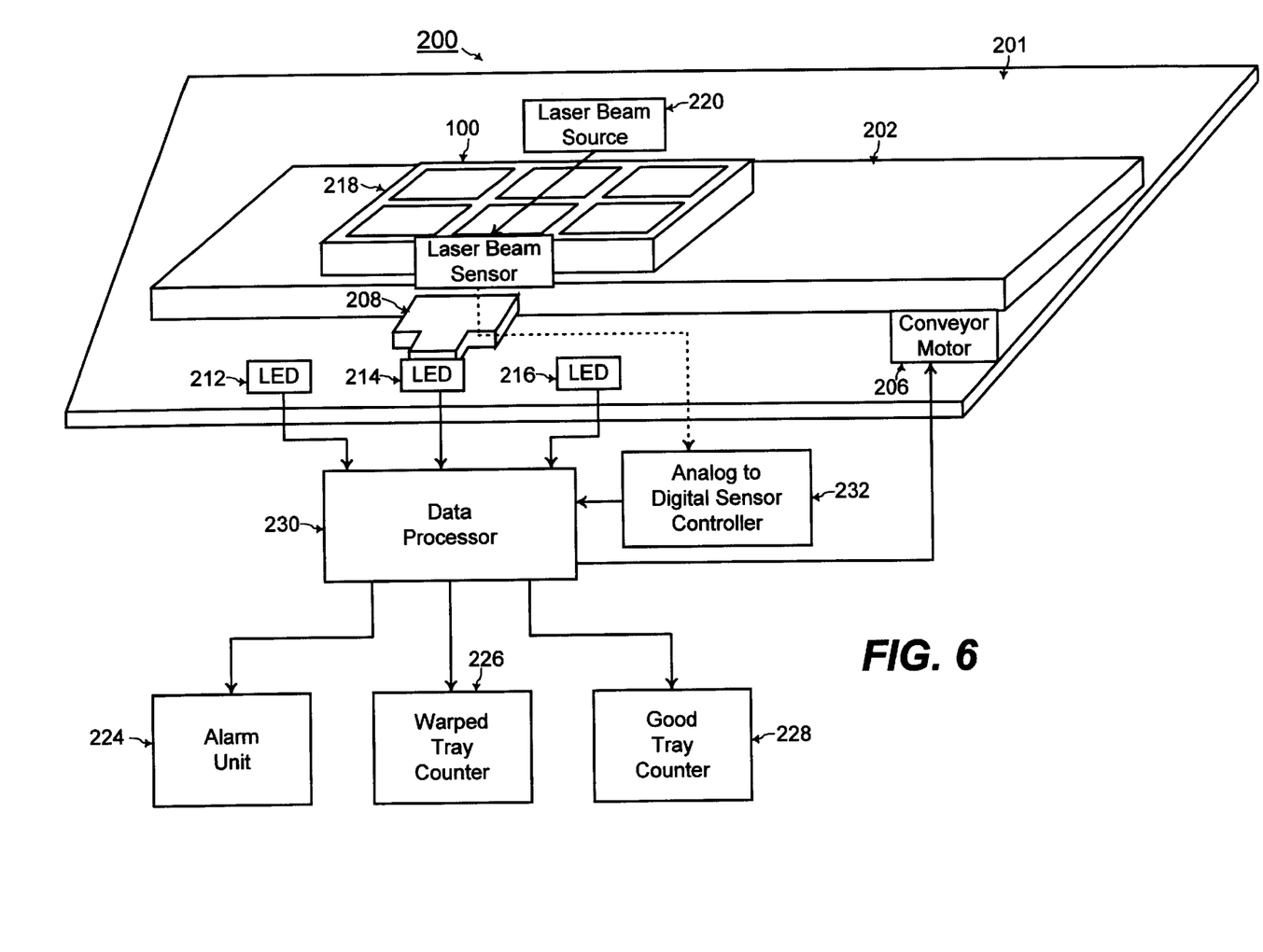
FIG.6 shows the laser beam of the apparatus of FIG. 3 being directed toward a second location of the tray substantially toward a center of the tray along the length of the tray, according tan embodiment of the present invention.

On the other hand, if the highest measured height is less than the predetermined value when the bracket 208 is at the first tray position sensor 212, referring to FIGS. 4 and 6, the data processor 230 controls the conveyor motor 206 to further move the tray 100 along the predetermined linear path until the bracket 208 reaches the second tray position sensor 214. When the bracket 208 reaches the respective location of the second tray position sensor 214, the bracket 208 blocks the light from the LED of the second tray position sensor 214, and this light is reflected by the bracket 208 such that the photodiode at the second tray position sensor 214 detects the reflected light. When this photodiode detects the reflected light, a signal is sent from the photodiode of the second tray position sensor 214 to the data processor 230 indicating that the bracket 208 has reached the second tray position sensor 214.

At this point, the data processor 230 controls the conveyor motor 206 to stop movement of the tray 100 along the predetermined linear path. Referring to FIG. 6, when the tray 100 is held stationary with the bracket 208 being substantially at the second tray position sensor 212, the measured location of the tray 100 is substantially near the center along the length of the tray 100.

As already described in reference to FIG. 5, the portion of the laser beam that is not blocked by the tray 100 is detected by the laser beam sensor 222, and this portion of the laser beam indicates the highest measured height at the measured location of the tray 100. The laser beam sensor 222 generates a signal indicating the highest measured height at the measured location of the tray 100 that is substantially near the center along the length of the tray 100.

The analog-to-digital sensor controller 232 then compares the highest measured height of the tray 100 at this measured location to the predetermine value when the bracket 208 is at the second tray position sensor 214. If this highest measured height is greater than the predetermined value, then the analog-to-digital sensor controller 232 determines that the tray 100 is unacceptably warped, and sends a reject signal to the data processor 230.

If the tray 100 is determined to be unacceptably warped when the bracket 208 is at the second tray position sensor 214, the data processor 230 may control the alarm unit 224 to generate a warning signal such as a visual or audible signal to an operator. In that case, the operator scraps the unacceptably warped tray 100, and the data processor 230 increments the warped tray counter 226 to keep count of the number of unacceptably warped trays.

Figure 7:
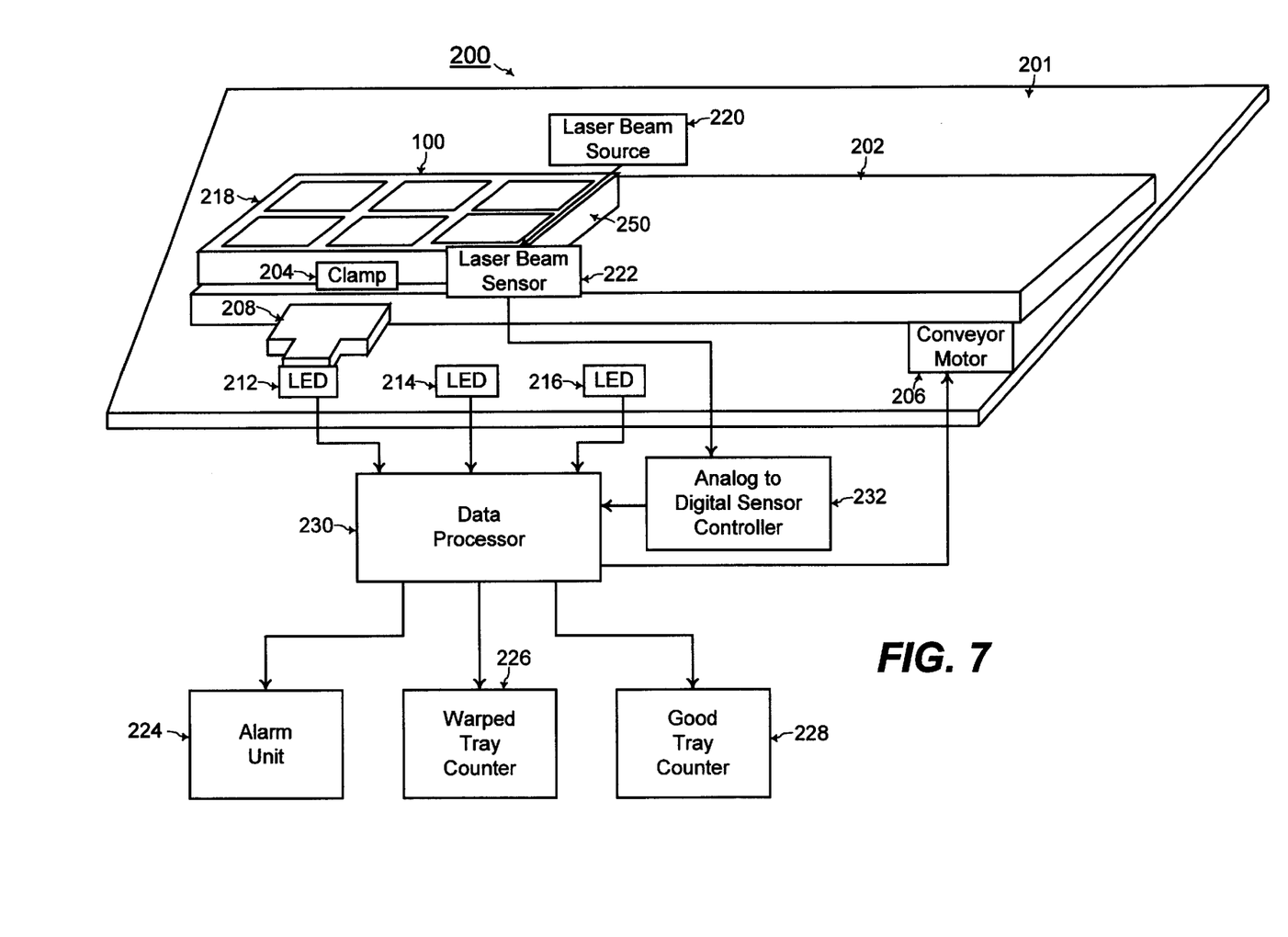
FIG. 7 shows the laser beam of the apparatus of FIG. 3 being directed toward a third location of the tray substantially toward a back end of the tray along the length of the tray, according to an embodiment of the present invention.

On the other hand, if the highest measured height is less than the predetermined value when the bracket 208 is at the second tray position sensor 214, referring to FIGS. 6 and 7, the data processor 230 controls the conveyor motor 206 to further move the tray 100 along the predetermined linear path until the bracket 208 reaches the third tray position sensor 216. When the bracket 208 reaches the respective location of the third tray position sensor 216, the bracket 208 blocks the light from the LED of the third tray position sensor 216, and this light is reflected by the bracket 208 such that the photodiode at the third tray position sensor 216 detects the reflected light. When the photodiode detects the reflected light, a signal is sent from the photodiode of the third tray position sensor 216 to the data processor 230 indicating that the bracket 208 has reached the third tray position sensor 216.

At this point, the data processor 230 controls the conveyor motor 206 to stop movement of the tray 100 along the predetermined linear path. Referring to FIG. 7, when the tray 100 is held stationary with the bracket 208 being substantially at the third tray position sensor 216, the measured location of the tray 100 is substantially near a back end 250 of the tray 100 along the length of the tray 100.

As already described in reference to FIG. 5, the portion of the laser beam that is not blocked by the tray 100 is detected by the laser beam sensor 222, and this portion of the laser beam indicates the highest measured height at the measured location of the tray 100. The laser beam sensor 222 generates a signal indicating the highest measured height at the measured location of the tray 100 that is substantially near a back end 250 of the tray 100 along the length of the tray 100.

The analog-to-digital sensor controller 232 then compares the highest measured height of the tray 100 at this measured location to the predetermine value when the bracket 208 is at the third tray position sensor 216. If this highest measured height is greater than the predetermined value, then the tray 100 is determined by the analog-to-digital sensor controller 232 to be unacceptably warped.

If the tray 100 is determined to be unacceptably warped when the bracket 208 is at the third tray position sensor 216, the data processor 230 may control the alarm unit 224 to generate a warning signal such as a visual or audible signal to an operator. In that case, the operator scraps the unacceptably warped tray 100, and the data processor 230 increments the warped tray counter 226 to keep count of the number of unacceptably warped trays.

On the other hand, if the highest measured height is less than the predetermined value when the bracket 208 is at the third tray position sensor 216, then all of the respective highest measured heights are less than the predetermined value when the bracket 208 is at the first, second and third tray position sensors 212, 214, and 216. In that case, the tray 100 is determined by the analog-to-digital sensor controller 232 to be a good tray that is not unacceptably warped. The data processor may control the alarm unit 224 to generate a visual or audible signal to indicate to an operator that the tray 100 is a good tray that is not unacceptably warped. In addition, the data processor increments the good tray counter 228 to keep count of the number of good trays that are not unacceptably warped.

In this manner, a laser beam sensor is used for determining a highest measured height of the tray at a plurality of locations along the length of the tray for automatically detecting for an unacceptably warped tray. An operator simply places the tray on the conveyor 202, and the apparatus 200 automatically detects for an unacceptably warped tray. Thus, excessive time consumption and human error are avoided in using feeler gauges for manually detecting for an unacceptably warped tray in the prior art. A warning signal is provided to the operator if a tray is detected to be an unacceptably warped tray such that the unacceptably warped tray is scrapped to avoid bent leads on IC packages.

The foregoing is by way of example only and is not intended to be limiting. For example, the present invention is described for an example tray 100 for holding IC packages. However, the present invention may advantageously be used for other shapes of trays for holding IC packages, as would be apparent to one of ordinary skill in the art from the description herein.

Furthermore, as will be understood by those skilled in the art, the structures described herein may be made or used in the same way regardless of their position and orientation. Accordingly, it is to be understood that terms and phrases such as "front end," "center," and "back end" as used herein refer to relative location and orientation of various portions of the structures with respect to one another, and are not intended to suggest that any particular absolute orientation with respect to external objects is necessary or required. The present invention is limited only as defined in the following claims and equivalents thereof.

We claim:

1. Apparatus for automatically detecting unacceptable warpage of a tray for holding a plurality of integrated circuit packages, the apparatus comprising:

a conveyor for holding and moving said tray along a predetermined linear path, said predetermined linear path being along a length of said tray;

a plurality of tray position sensors, wherein each tray position sensor is disposed at a respective location along said predetermined linear path, and wherein each tray position sensor detects when an object that moves with said conveyor has reached said respective location along said predetermined linear path;

a laser beam source disposed on a first side of said predetermined path for generating a laser beam toward a first side of said tray, said laser beam having a field that extends through any possible height of said tray;

a laser beam sensor disposed on a second side of said predetermined path and facing toward a second side of said tray that is opposite said first side of said tray such that said laser beam sensor detects a portion of said laser beam that is not blocked by said tray; and a data processor coupled to said conveyor, said plurality of tray position sensors, and said laser beam sensor, wherein the data processor controls the conveyor to move said tray along said predetermined path, and wherein when said object that moves with said conveyor reaches a tray position sensor, said data processor controls the conveyor to stop movement of said tray such that a measured height of said tray is determined at a measured location of said tray from said portion of said laser beam that is not blocked by said tray at said measured location of said tray as detected by said laser beam sensor;

and wherein said tray is determined to be unacceptably warped when said measured height is greater than a predetermined value.

2. The apparatus of claim 1, further comprising:

an analog-to-digital sensor controller, coupled between said laser beam sensor and said data processor, for comparing said measured height with said predetermined value for determining whether said tray is unacceptably warped.

3. The apparatus of claim 1, wherein the plurality of tray position sensors are positioned along the predetermined path such that a respective measured height of said tray is determined at each of a front location of said tray substantially toward said front end of said tray along said length of said tray, a center location of said tray substantially toward a center along said length of said tray, and a back location of said tray substantially toward a back end of said tray along said length of said tray.

4. The apparatus of claim 3, wherein said tray is determined to be unacceptably warped when any of said respective measured height of said tray at said front location, said center location, or said back location is greater than said predetermined value.

5. The apparatus of claim 1, further comprising:
an alarm unit, coupled to said data processor, for warning an operator when said tray is determined to be unacceptably warped.

6. The apparatus of claim 1, further comprising:
a first counter, coupled to said data processor, for counting a first number of unacceptably warped trays; and
a second counter, coupled to said data processor, for counting a second number of good trays that are not unacceptably warped.

7. The apparatus of claim 1, wherein said conveyor comprises:
a clamping mechanism for fixedly holding said tray to said conveyor.

8. Apparatus for detecting unacceptable warpage of a tray for holding a plurality of integrated circuit packages, the apparatus comprising:
a conveyor for holding and moving said tray along a predetermined linear path, said predetermined linear path being along a length of said tray, wherein said conveyor includes a clamping mechanism for fixedly holding said tray to said conveyor;
a plurality of tray position sensors, wherein each tray position sensor is disposed at a respective location along said predetermined linear path, and wherein each tray position sensor detects when a bracket connected to said conveyor has reached said respective location along said predetermined linear path;
a laser beam source disposed on a first side of said predetermined path for generating a laser beam toward a first side of said tray, said laser beam having a field that extends through any possible height of said tray;
a laser beam sensor disposed on a second side of said predetermined path and facing toward a second side of said tray that is opposite said first side of said tray such that said laser beam sensor detects a portion of said laser beam that is not blocked by said tray;
a data processor coupled to said conveyor, said plurality of tray position sensors, and said laser beam sensor through an analog-to-digital sensor controller, wherein the data processor controls the conveyor to move said tray along said predetermined path, and wherein when said bracket that moves with said conveyor reaches a tray position sensor, said data processor controls the conveyor to stop movement of said tray such that said analog-to-digital sensor controller determines a measured height of said tray at a measured location of said tray from said portion of said laser beam that is not blocked by said tray at said measured location of said tray as detected by said laser beam sensor;
and wherein said analog-to-digital sensor controller determines that said tray is unacceptably warped when said measured height is greater than a predetermined value;
and wherein the plurality of tray position sensors are positioned along the predetermined path such that a respective measured height of said tray is determined at each of a front location of said tray substantially toward said front end of said tray along said length of said tray, a center location of said tray substantially toward a center along said length of said tray, and a back location of said tray substantially toward a back end of said tray along said length of said tray;
and wherein said analog-to-digital sensor controller determines that said tray is unacceptably warped when any of said respective measured height of said tray at said front location, said center location, or said back location is greater than said predetermined value;
an alarm unit, coupled to said data processor, for warning an operator when said tray is determined to be unacceptably warped;
a first counter, coupled to said data processor, for counting a first number of unacceptably warped trays; and
a second counter, coupled to said data processor, for counting a second number of good trays that are not unacceptably warped.

9. A method for automatically detecting unacceptable warpage of a tray for holding a plurality of integrated circuit packages, the method including the steps of:
moving with a conveyor said tray along a predetermined linear path with said tray being held by said conveyor, said predetermined linear path being along a length of said tray;
detecting at each of a plurality of tray position sensors when an object that moves with said conveyor has reached a respective location along said predetermined linear path for a plurality of locations along said predetermined linear path;
generating a laser beam toward a first side of said tray, said laser beam having a field that extends through any possible height of said tray;
detecting, at a second side of said tray that is opposite said first side of said tray, a portion of said laser beam that is not blocked by said tray; and
controlling the conveyor to move said tray along said predetermined path and to stop movement of said tray when said object that moves with said conveyor reaches a tray position sensor;
determining, when said movement of said tray is stopped, a measured height of said tray at a measured location of said tray from said portion of said laser beam that is not blocked by said tray at said measured location of said tray as detected by said laser beam sensor; and
determining that said tray is unacceptably warped when said measured height is greater than a predetermined value.

10. The method of claim 9, further including the step of:
determining a respective measured height of said tray at each of a front location of said tray substantially toward said front end of said tray along said length of said tray, a center location of said tray substantially toward a center along said length of said tray, and a back location of said tray substantially toward a back end of said tray along said length of said tray.

11. The method of claim 10, further including the step of:
determining that said tray is unacceptably warped when any of said respective measured height of said tray at said front location, said center location, or said back location is greater than said predetermined value.

12. The method of claim 9, further including the step of:
warning an operator when said tray is determined to be unacceptably warped.

13. The method of claim 9, further including the steps of:
counting a first number of unacceptably warped trays; and
counting a second number of good trays that are not unacceptably warped.

14. The method of claim 9, further including the step of:
clamping said tray to said conveyor such that said conveyor fixedly holds said tray as said conveyor moves said tray.

* * * * *